(12) United States Patent
Misu et al.

(10) Patent No.: US 11,584,379 B2
(45) Date of Patent: *Feb. 21, 2023

(54) SYSTEM AND METHOD FOR LEARNING NATURALISTIC DRIVING BEHAVIOR BASED ON VEHICLE DYNAMIC DATA

(71) Applicant: Honda Motor Co., Ltd., Tokyo (JP)

(72) Inventors: Teruhisa Misu, Mountain View, CA (US); Yi-Ting Chen, Sunnyvale, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 424 days.

This patent is subject to a terminal disclaimer.

(21) Appl. No.: 16/055,798

(22) Filed: Aug. 6, 2018

(65) Prior Publication Data

US 2020/0039520 A1 Feb. 6, 2020

(51) Int. Cl.
*B60W 40/09* (2012.01)
*G05D 1/00* (2006.01)
*B60W 40/04* (2006.01)
*B60W 50/00* (2006.01)

(52) U.S. Cl.
CPC ............ *B60W 40/09* (2013.01); *B60W 40/04* (2013.01); *G05D 1/0088* (2013.01); *B60W 2050/0075* (2013.01); *B60W 2420/42* (2013.01); *B60W 2540/043* (2020.02); *B60W 2556/10* (2020.02)

(58) Field of Classification Search
None
See application file for complete search history.

(56) References Cited

U.S. PATENT DOCUMENTS

| | | | | |
|---|---|---|---|---|
| 9,443,153 B1* | 9/2016 | Gupta | ................ | G06K 9/6256 |
| 9,524,461 B1* | 12/2016 | Huynh | ................ | G06N 3/008 |
| 9,713,982 B2* | 7/2017 | Buibas | ................ | G05D 1/0251 |
| 10,019,011 B1* | 7/2018 | Green | ................ | B60W 30/0953 |
| 10,077,056 B1* | 9/2018 | Fields | ................ | B60W 50/0098 |
| 10,168,705 B2* | 1/2019 | Kazemi | ................ | G08G 1/0129 |
| 10,189,482 B2* | 1/2019 | Huber | ................ | B60W 30/09 |

(Continued)

FOREIGN PATENT DOCUMENTS

WO    WO-2017123665 A1 *  7/2017  ........... G07C 5/0808

OTHER PUBLICATIONS

Shaoqing Ren, et al.; Faster R-CNN: Towards Real-Time Object Detection with Region Proposal Networks; NIPS; Jan. 6, 2016; pp. 1-14.

(Continued)

*Primary Examiner* — Mahmoud S Ismail
(74) *Attorney, Agent, or Firm* — Rankin, Hill & Clark LLP

(57) ABSTRACT

A system and method for learning naturalistic driving behavior based on vehicle dynamic data that include receiving vehicle dynamic data and image data and analyzing the vehicle dynamic data and the image data to detect a plurality of behavioral events. The system and method also include classifying at least one behavioral event as a stimulus-driven action and building a naturalistic driving behavior data set that includes annotations that are based on the at least one behavioral event that is classified as the stimulus-driven action. The system and method further include controlling a vehicle to be autonomously driven based on the naturalistic driving behavior data set.

20 Claims, 8 Drawing Sheets

(56) References Cited

U.S. PATENT DOCUMENTS

| | | | |
|---|---|---|---|
| 10,239,538 B1* | 3/2019 | Fields | G05D 1/0088 |
| 10,460,600 B2* | 10/2019 | Julian | G06K 9/00791 |
| 10,513,273 B1* | 12/2019 | Stark | G05D 1/0223 |
| 10,656,644 B2* | 5/2020 | Lin | B60W 40/09 |
| 10,689,003 B1* | 6/2020 | Fields | B60W 50/0098 |
| 10,739,775 B2* | 8/2020 | Sun | G06N 7/005 |
| 10,754,037 B2 | 8/2020 | England et al. | |
| 10,769,494 B2* | 9/2020 | Xiao | G06N 20/00 |
| 10,782,694 B2* | 9/2020 | Zhang | G05D 1/0088 |
| 2014/0310739 A1* | 10/2014 | Ricci | B60R 25/25 725/28 |
| 2015/0141043 A1* | 5/2015 | Abramson | H04W 4/027 455/456.1 |
| 2015/0149017 A1* | 5/2015 | Attard | B60W 30/18163 701/23 |
| 2016/0161270 A1* | 6/2016 | Okumura | B60W 30/18163 701/23 |
| 2016/0216130 A1* | 7/2016 | Abramson | G01C 21/3423 |
| 2017/0057514 A1* | 3/2017 | Toyoda | B60W 30/18154 |
| 2017/0200061 A1* | 7/2017 | Julian | G06K 9/00791 |
| 2017/0253252 A1* | 9/2017 | Donnelly | G06F 3/0338 |
| 2017/0369072 A1* | 12/2017 | Huber | B60W 50/14 |
| 2018/0067488 A1* | 3/2018 | Pollach | G06N 20/00 |
| 2018/0124085 A1 | 5/2018 | Frayman et al. | |
| 2018/0292824 A1* | 10/2018 | Kazemi | G08G 1/0112 |
| 2018/0292830 A1* | 10/2018 | Kazemi | G01C 21/3484 |
| 2019/0009785 A1* | 1/2019 | Lawrenson | G01S 17/66 |
| 2019/0042859 A1 | 2/2019 | Schubert et al. | |
| 2019/0072960 A1* | 3/2019 | Lin | B60W 40/09 |
| 2019/0072966 A1 | 3/2019 | Zhang et al. | |
| 2019/0163181 A1* | 5/2019 | Liu | G05B 17/02 |
| 2019/0202453 A1* | 7/2019 | Farooqi | B60W 50/06 |
| 2019/0332109 A1* | 10/2019 | Kolouri | G06K 9/00805 |
| 2019/0333371 A1* | 10/2019 | Julian | G06K 9/00845 |
| 2020/0174490 A1* | 6/2020 | Ogale | G05D 1/0231 |

OTHER PUBLICATIONS

Kaiming He, et al.; Deep Residual Learning for Image Recognition; CVPR; 2016; pp. 770-778.

Hengshuang Zhao, et al.; Pyramid Scene Parsing Network; CVPR; 2017; pp. 2881-2890.

Kaiming He, et al.; Mask R-CNN; ICCV; Jan. 24, 2018; pp. 1-12.

Jia Deng, et al.; ImageNet: A Large-Scale Hierarchical Image Database; CVPR; 2009; pp. 1-8.

Tsung-Yi Lin, et al.; Microsoft COCO: Common Objects in Context; ECCV; Feb. 21, 2015; pp. 1-15.

Andreas Geiger, et al.; Are We Ready for Autonomous Driving? The KITTI Vision Benchmark Suite; CVPR; 2012; pp. 1-8.

Marius Cordts, et al.; The Cityscapes Dataset for Semantic Urban Scene Understanding; CVPR; Apr. 7, 2016; pp. 1-29.

Will Maddern, et al.; 1 Year, 1000km: The Oxford RobotCar Dataset; The International Journal of Robotics Research (IJRR); 2017; pp. 3-15; vol. 36, No. 1.

Chenyi Chen, et al.; DeepDriving; Learning Affordance for Direct Perception in Autonomous Driving; ICCV; Sep. 26, 2015; pp. 1-9.

Eder Santana, et al.; Learning a Driving Simulator; CoRR; Aug. 3, 2016; pp. 1-8; vol. abs/1608.01230.

Huazhe Xu, et al.; End-to-end Learning of Driving Models from Large-scale Video Datasets; CVPR; Jul. 23, 2017; pp. 1-9.

Dinesh Jayaraman, et al.; Learning image representations tied to ego-motion; ICCV; 2015; pp. 1-9.

Vashisht Madhavan, et al.; The BDD-Nexar Collective: A Large-Scale, Crowsourced, Dataset of Driving Scenes; Master's Thesis, EECS Department, University of Berkeley; May 29, 2017; pp. 1-28.

Dejan Mitrovic; Reliable Method for Driving Events Recognition; IEEE Transactions on Intelligent Transportation Systems; Jun. 2005; pp. 198-205; vol. 6, No. 2.

Till Hulnhagen, et al.; Maneuver recognition using Probabilistic Finite-State Machines and Fuzzy Logic; IEEE Intelligent Vehicles Symposium, University of California; Jun. 21-24, 2010; pp. 65-70; San Diego, CA, USA.

Kazuya Takeda, et al.; International Large-Scale Vehicle Corpora for Research on Driver Behavior on the Road; IEEE Transactions on Intelligent Transportation Systems; Dec. 2011; pp. 1609-1623; vol. 12, No. 4.

Yang Zheng, et al.; Threshold based Decision-Tree for Automatic Driving Maneuver Recognition using CAN-Bus Signal; IEEE 17th International Conference on Intelligent Transportation Sytems (ITSC); Oct. 8-11, 2014; pp. 2834-2839; Qingdao, China.

Hideomi Amata, et al.; Prediction Model of Driving Behavior Based on Traffic Conditions and Driver Types; 12th International IEEE Conference on Intelligent Transportation Sytems; Oct. 3-7, 2009; pp. 747-752; Saint Louis, MO, USA.

Sujitha Martin, et al.; Dynamics of Driver's Gaze: Explorations in Behavior Modeling & Maneuver Prediction; IEEE Transactions on Intelligent Vehicles; Jan. 31, 2018; pp. 1-10; vol. 2.

John A. Michon; A Critical View of Driver Behavior Models: What do we know, what should we do?; Human Behavior and Traffic Safety; 1985; pp. 485-520; Plenum Press; New York.

Vasili Ramanishka, et al.; Toward Driving Scene Understanding: A Dataset for Learning Driver Behavior and Causal Reasoning; CVPR; 2018; pp. 7699-7707.

Office Action of U.S. Appl. No. 16/185,514 dated Feb. 26, 2021, 55 pages.

Office Action of U.S. Appl. No. 16/185,514 dated Jul. 21, 2021, 46 pages.

Office Action of U.S. Appl. No. 16/185,514 dated Oct. 28, 2021, 53 pages.

Notice of Allowance of U.S. Appl. No. 16/185,514 dated Mar. 2, 2022, 14 pages.

* cited by examiner

| GOAL-DRIVEN ACTION | # INSTANCES | AVG./STD. DURATION |
|---|---|---|
| INTERSECTION PASSING | 6396 | 3.48 / 2.19 |
| LEFT TURN | 1673 | 5.71 / 3.41 |
| RIGHT TURN | 1668 | 5.14 / 2.48 |
| LEFT LANE CHANGE | 600 | 3.32 / 1.83 |
| RIGHT LANE CHANGE | 558 | 3.35 / 1.67 |
| CROSSWALK PASSING | 835 | 1.19 / 1.39 |
| U-TURN | 85 | 9.96 / 5.51 |
| LEFT LANE BRANCH | 283 | 2.57 / 1.14 |
| RIGHT LANE BRANCH | 112 | 2.68 / 1.42 |
| MERGE | 172 | 3.00 / 2.21 |
| STIMULUS-DRIVEN ACTION | # INSTANCES | AVG./STD. DURATION |
| STOP | 5325 | 4.08 / 2.03 |
| DEVIATE | 181 | 4.63 / 2.45 |
| CAUSE | # INSTANCES | AVG./STD. DURATION |
| SIGN | 2423 | 4.28 / 2.44 |
| CONGESTION | 1989 | 3.86 / 1.59 |
| TRAFFIC LIGHT | 761 | 4.05 / 1.47 |
| PEDESTRIAN | 104 | 4.05 / 1.47 |
| PARKED CAR | 171 | 4.74 / 2.49 |
| ATTENTION | # INSTANCES | AVG./STD. DURATION |
| CROSSING VEHICLE | 2088 | 8.85 / 11.92 |
| CROSSING PEDESTRIAN | 861 | 7.20 / 5.20 |
| RED LIGHT | 1500 | 25.72 / 20.45 |
| CUT-IN | 474 | 3.43 / 1.63 |
| SIGN | 312 | 2.38 / 1.96 |
| ON-ROAD BICYCLIST | 397 | 4.38 / 5.65 |
| PARKED VEHICLE | 199 | 2.93 / 3.23 |
| MERGING VEHICLE | 476 | 4.39 / 4.26 |
| YELLOW LIGHT | 263 | 3.37 / 4.41 |
| ROAD WORK | 134 | 12.74 / 14.99 |
| PEDESTRIAN NEAR EGO LANE | 77 | 2.80 / 2.18 |

FIG. 3

SYSTEM AND METHOD FOR LEARNING NATURALISTIC DRIVING BEHAVIOR BASED ON VEHICLE DYNAMIC DATA

BACKGROUND

Most autonomous driving systems take sensor data into account when providing autonomous driving functionality. The sensor data takes into account objects, roadways, and obstacles that may be faced by the vehicle during vehicle operation in real-time. However, these systems do not provide vehicle operation that takes a driver's logic, attentive behavior, and casual reactions into account when providing autonomous driving functionality. Consequently, such systems do not address many challenges associated with higher level situational understanding that may be necessary to provide an intelligent automated driving system that efficiently adapts to various scenarios within a dynamic driving environment.

BRIEF DESCRIPTION

According to one aspect, a computer-implemented method for learning naturalistic driving behavior based on vehicle dynamic data that includes receiving vehicle dynamic data and image data and analyzing the vehicle dynamic data and the image data to detect a plurality of behavioral events. The computer-implemented method also includes classifying at least one behavioral event as a stimulus-driven action and building a naturalistic driving behavior data set that includes annotations that are based on the at least one behavioral event that is classified as the stimulus-driven action. The computer-implemented method further includes controlling a vehicle to be autonomously driven based on the naturalistic driving behavior data set.

According to another aspect, a system for learning naturalistic driving behavior based on vehicle dynamic data that includes a memory storing instructions when executed by a processor that cause the processor receive vehicle dynamic data and image data and analyze the vehicle dynamic data and the image data to detect a plurality of behavioral events. The instructions also cause the processor to classify at least one behavioral event as a stimulus-driven action and build a naturalistic driving behavior data set that includes annotations that are based on the at least one behavioral event that is classified as the stimulus-driven action. The instructions further cause the processor to control a vehicle to be autonomously driven based on the naturalistic driving behavior data set.

According to still another aspect, non-transitory computer readable storage medium storing instructions that when executed by a computer, which includes a processor perform a method that includes receiving vehicle dynamic data and image data and analyzing the vehicle dynamic data and the image data to detect a plurality of behavioral events. The method also includes classifying at least one behavioral event as a stimulus-driven action. The method additionally includes building a naturalistic driving behavior data set that includes annotations that are based on the at least one behavioral event that is classified as the stimulus-driven action. The method further includes controlling a vehicle to be autonomously driven based on the naturalistic driving behavior data set.

BRIEF DESCRIPTION OF THE DRAWINGS

FIG. 3 is an illustrated example of a naturalistic driving behavior data set according to an exemplary embodiment of the present disclosure;

DETAILED DESCRIPTION

Figure 1:
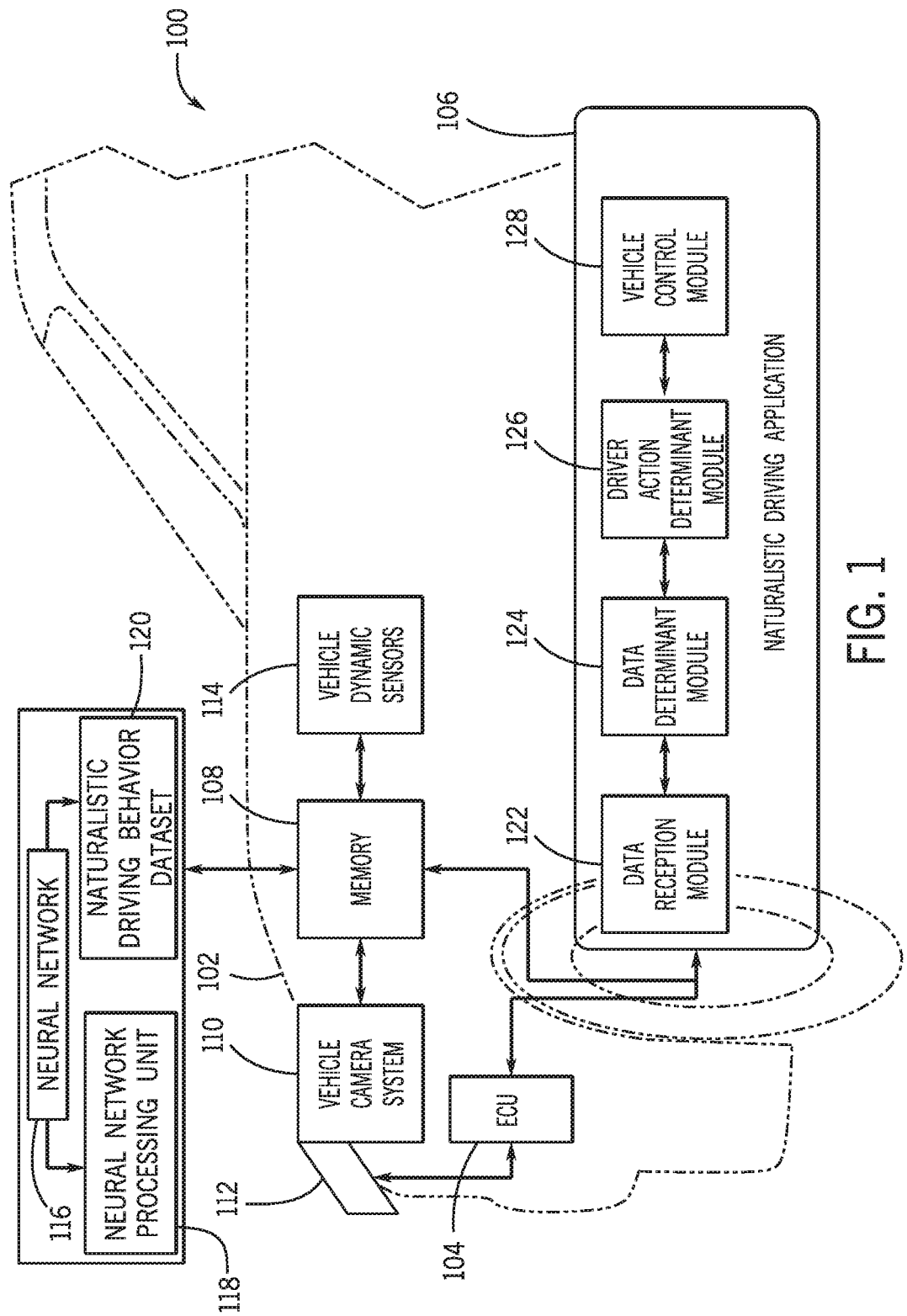
FIG. 1 is a schematic view of an exemplary operating environment for implementing systems and methods for learning naturalistic driving behavior based on vehicle dynamic data according to an exemplary embodiment of the present disclosure.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an exemplary operating environment 100 for implementing systems and methods for learning naturalistic driving behavior based on vehicle dynamic data according to an exemplary embodiment of the present disclosure. The components of the environment 100, as well as the components of other systems, hardware architectures, and software architectures discussed herein, can be combined, omitted, or organized into different architectures for various embodiments.

Generally, the environment 100 includes a vehicle 102 with an electronic control unit (ECU) 104 that executes one or more applications, operating systems, vehicle system and subsystem user interfaces, among others. The ECU 104 may also execute a naturalistic driving application 106 that may be configured to understand driver behaviors associated with a driver (not shown) driving the vehicle 102 in various traffic scenes. The application 106 may utilize a neural network 116 with machine learning and deep learning to provide artificial intelligence capabilities that maybe utilized to build and maintain a naturalistic driving behavior data set 120 with annotations associated with a four layer annotation scheme and related data associated with the four layer annotation scheme. The application 106 may process information from various sources provided as inputs and may utilize the neural network 116 to provide various functions, that may include, but may not be limited to computer vision, object classification, feature recognition, multilayer perceptions, and autonomous driving commands.

The naturalistic driving application 106 may utilize the four layer annotation scheme during one or more periods of time that may constitute one or more respective trips of the vehicle 102. The one or more trips of the vehicle 102 may include operation and travel of the vehicle 102 that may be conducted in various locations and to various destinations during one or more periods of time. The four layer annotation scheme may be utilized to include classes of driving processes that include, but may not be limited to, an operational process that corresponds to the manipulation of the vehicle 102, a tactical process that includes interactions between the vehicle 102, traffic participants, and the surrounding environment of the vehicle 102, and a strategic process for higher level reasoning, planning, and decision making.

In an exemplary embodiment, the four layer annotation scheme may include the categorization of one or more behavioral events as goal-oriented actions that may include the driver's manipulation(s) of the vehicle 102 in a navigation task (e.g., right turn) that may be based on a driver's possible intent. The four layer annotation scheme may also include the categorization of one or more behavioral events as stimulus-driven actions (e.g., stopping the vehicle 102) that may be indicative of a reason (due to a driver's reaction to) or one or more external stimuli.

The four layer annotation scheme may also include a determination of causal reasoning of the one or more behavioral events classified as stimulus-driven actions to explain the reasoning for the behavioral events classified as the stimulus driven actions (e.g., a stopped truck in front of the vehicle 102 is an immediate cause for stopping the vehicle 102). Additionally, the four layer annotation scheme may include the determination of driver actions associated with one or more attention capturing traffic related objects that may be attended to by the driver during the course of one or more behavioral events classified as stimulus-driven actions (e.g., a pedestrian that may be attended by the driver of the vehicle 102 since the pedestrian might perform certain action that would affect the driver's behavior).

Figure 2:
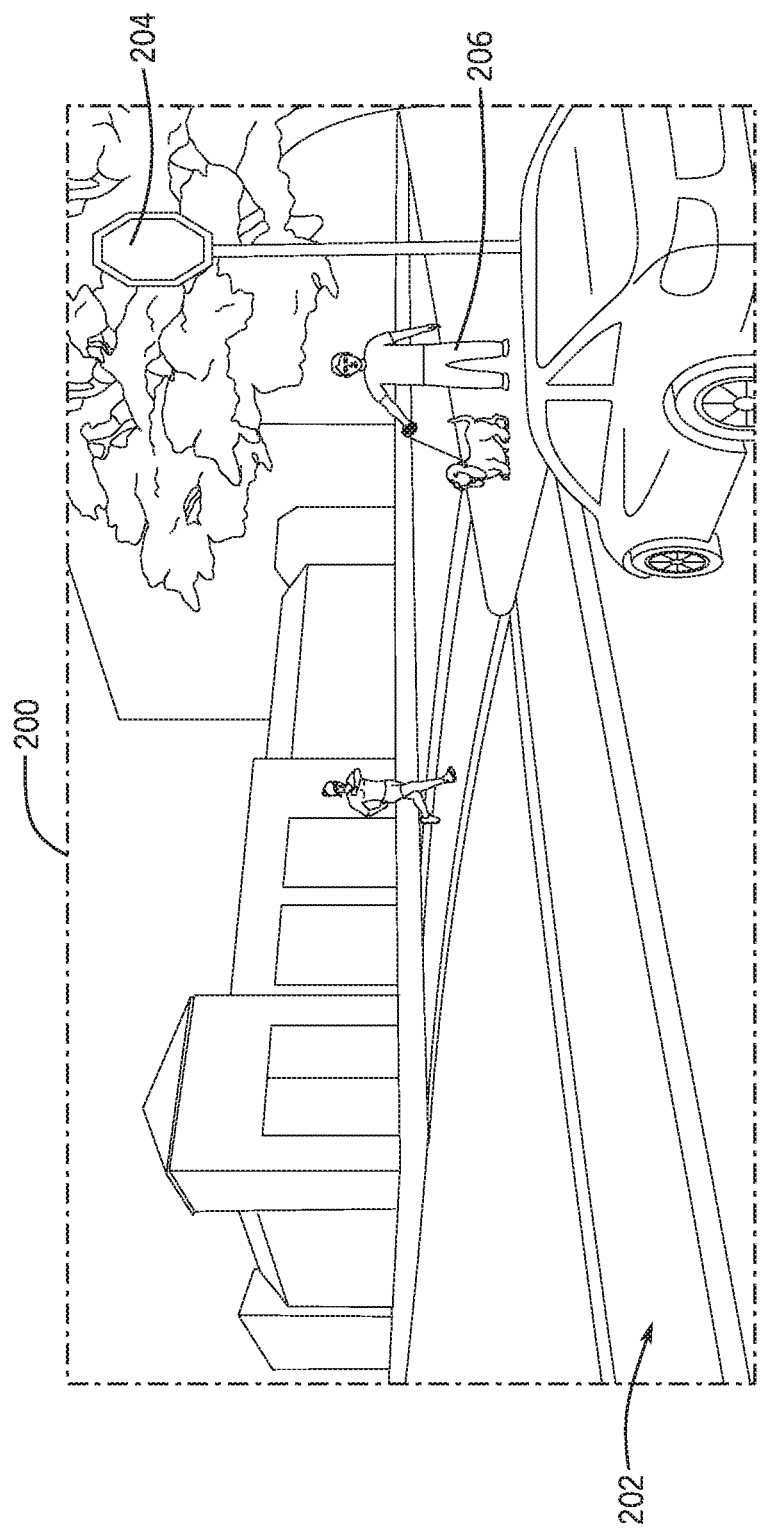
FIG. 2 is an illustrative example of a scene that includes a plurality of exemplary behavioral events according to an exemplary embodiment of the present disclosure.

FIG. 2 includes an illustrative example of a scene 200 that includes a plurality of exemplary behavioral events that may occur when the vehicle 102 is about to turn right at a traffic intersection 202 and is stopped at the traffic intersection 202 according to an exemplary embodiment of the present disclosure. A stimulus-driven action may be determined as a right turn that is based on feature vectors (discussed below) associated with steering angle data and turn signal data. Additionally, the goal-driven action of slowing down the vehicle 102 to make the turn maybe determined based on the determined stimulus-driven action. A cause associated with the driving maneuver classified as a stimulus driven action may be determined to be a stop sign 204 that may be located at the traffic intersection 202. Furthermore, an attention capturing traffic related object that may be attended by the driver of the vehicle 102 may include a pedestrian 206 that may cross the traffic intersection 202 at which the vehicle 102 is stopped.

Referring again to FIG. 1, the four layer annotation scheme may be based on one or more sources of data associated with the vehicle dynamic information associated with the operation of the vehicle 102 and/or the surrounding (external) environment of the vehicle 102. Additionally, image data may be utilized by the application 106 to obtain distance(s) between a center point (not shown) of the vehicle 102 and one or more lane markers of a lane of a roadway on which the vehicle 102 is traveling during the trip of the vehicle 102 to determine confidence scores that may be utilized with respect to the classification of one or more frames (e.g., data frames) associated with the vehicle dynamic data.

In some embodiments, additional image data associated with the surrounding environment of the vehicle 102 may be analyzed to determine causal reasoning data that may be used to annotate one or more stimulus-driven actions. In one or more embodiments, the application 106 may also add related data associated with the four layer annotation scheme for each trip of the vehicle 102 to the naturalistic driving behavior data set 120 to be further utilized to control the vehicle 102 to be autonomously driven to provide natural driving behaviors in various traffic scenes.

The four layer annotation scheme may be utilized to detect driver behaviors based on a detection of behavioral events which occur during driving sessions by associating the interactions between human driver behaviors and corresponding traffic scene situations. In one or more configurations, the complete driving scene understanding may enable the application 106 to provide one or more commands to autonomously control the vehicle 102 to be driven in a manner that accounts for one or more behavioral events, the driver's casual reasoning when conducting stimulus-driven actions, and the driver's attention to one or more traffic related objects that may influence driving behaviors when conducting the stimulus-driven actions.

With continued reference to FIG. 1, the vehicle 102 may include a plurality of components, for example, a memory 108, a vehicle camera system 110 that is operably connected to one or more cameras 112, and a plurality of vehicle dynamic sensors 114. The ECU 104 and each of the plurality of components of the vehicle 102 discussed above that are operably connected to the ECU 104 will now be discussed in more detail. In an exemplary embodiment, the ECU 104 may be configured to operably control the plurality of components of the vehicle 102. The ECU 104 may additionally provide one or more commands to one or more control units (not shown) of the vehicle 102, including, but not limited to an engine control unit, a braking control unit, a transmission control unit, a steering control unit, and the like to control the vehicle 102 to be autonomously driven.

The autonomous control of the vehicle 102 may be provided to partially control driving of the vehicle 102 during one or more circumstances (e.g., safety controls, driver assist controls), and/or fully to control driving of the vehicle 102 during an entire trip of the vehicle 102. As discussed, the naturalistic driving application 106 may communicate with the ECU 104 to control the vehicle 102 to be autonomously driven in one or more traffic scenes based on the naturalistic driving behavior data set 120.

In one or more embodiments, the ECU 104 may include a microprocessor, one or more application-specific integrated circuit(s) (ASIC), or other similar devices. The ECU 104 may also include internal processing memory, an interface circuit, and bus lines for transferring data, sending commands, and communicating with the plurality of components of the vehicle 102. The ECU 104 may also include a communication device (not shown) for sending data internally in the vehicle 102 and communicating with externally hosted computing systems (e.g., external to the vehicle 102). Generally, the ECU 104 communicates with the memory 108 to execute the one or more applications, operating systems, vehicle systems and subsystem user interfaces, and the like that are stored within the memory 108.

The memory 108 may be configured to store one or more executable files associated with one or more operating systems, applications, associated operating system data, application data, vehicle system and subsystem user interface data, and the like that are executed by the ECU 104. In one or more embodiments, the memory 108 of the vehicle 102 may be accessed by the naturalistic driving application 106 to store data, for example, one or more images, videos, and/or vehicle dynamic data associated with the vehicle 102. In some embodiments, the memory 108 may include one or more traffic related object models (not shown) associated with one or more traffic related objects that represent values that include a range of sizes and features (based on image data) that are associated to different types of traffic related objects.

In an exemplary embodiment, the memory 108 may include the neural network 116. The neural network 116 may process a programming model which enables computer/machine based/deep learning that may be centered on one or more forms of data that are provided to the neural network 116. In addition to being hosted on the memory 108, in some embodiments, the neural network 116, subsets of the neural network 116, and/or subsets of data may be used by the neural network 116 may be hosted on an externally hosted server infrastructure (not shown) that may be configured to communicate with the ECU 104 of the vehicle 102 through the communication device of the ECU 104.

In one or more embodiments, the neural network 116 may include a neural network processing unit 118 that may be configured to utilize machine learning/deep learning to provide artificial intelligence capabilities that may be utilized to build and maintain the naturalistic driving behavior data set 120 with the four layer annotations scheme. The neural network processing unit 118 may process information that is provided as inputs and may utilize the naturalistic driving behavior data set 120 to access stored computer/machine learned annotations and associated data to provide various functions, that may include, but may not be limited to, object classification, feature recognition, computer vision, speed recognition, machine translation, autonomous driving commands, and the like.

In one embodiments, the neural network 116 may be configured as a convolutional neural network (CNN) that may be configured to receive inputs in the form of image data of video streams and may flatten the data and concatenate the data with sensor features provided by the vehicle dynamic sensors 114. The CNN may evaluate sensor values provided by vehicle dynamic sensors 114 of the vehicle 102 (e.g., velocity and yaw rate, turn signal information, steering angle, brake pressure, etc.) and may classify frames using a random forest classifier to detect behavioral events which occur during driving sessions and further classify the behavioral events and associated data based on the four-layer annotations scheme.

In one configuration, the CNN may extract a plurality of features based on sensor values provided by the vehicle dynamic sensors 114 to build and maintain the naturalistic driving behavior data set 120 with the four layer annotations scheme. In additional configurations, the system may utilize additional classification schemes or systems utilized to build and maintain the naturalistic driving behavior data set 120 with the four layer annotations scheme, that may include, but may not be limited to, support vector machines, logic-centric production systems, Bayesian belief networks, fuzzy logic models, data fusion engines, decision trees, probabilistic classification models and the like.

FIG. 3 is an illustrated example of the naturalistic driving behavior data set 300 according to an exemplary embodiment of the present disclosure. In one or more embodiments, the naturalistic driving application 106 may communicate with the neural network processing unit 118 of the neural network 116 to access the naturalistic driving behavior data set 300 to store one or more annotations associated with the four layer annotation data scheme. As shown in the illustrative example of FIG. 3, the naturalistic driving behavior data set 300 may include annotations associated with one or more behavioral events that may be classified in real-time by the application 106 as the goal-oriented actions 302 and the stimulus-driven actions 304.

The data set 300 may additionally include annotations that are determined as a cause 306 that is associated with one or more behavioral events that are classified as stimulus-driven actions 304. Additionally, the data set 300 may include annotations that are determined as attention capturing traffic related object(s) (shown as attention) 308 that may include one or more traffic related objects that may capture the attention of the driver one or more behavioral events classified as stimulus-driven actions 304 occur during each trip of the vehicle 102. As discussed, the annotations and related data may be determined in real-time during each trip of the vehicle 102 and may be added to the naturalistic driving behavior data set 120 to be utilized to autonomously control the vehicle 102 during the respective trip of the vehicle 102 and subsequent trips of the vehicle 102.

As discussed below, the naturalistic driving application 106 may utilize vehicle dynamic data along with image data that is used to classify the one or more behavioral events as the goal-oriented action 302 or the stimulus-driven action 304 to add underlying annotations and related data to the naturalistic driving behavior data set 120 (e.g., to train the neural network 116). Additionally, such data may be utilized by the application 106 to determine the cause 306 associated with the one or more behavioral events classified as stimulus-driven actions. The application 106 may thereby add respective annotations and related data attributed to the cause 306 to the naturalistic driving behavior data set 300. Image data may also be used to determine the one or more attention capturing traffic related objects 308 associated with the one or more behavioral events classified as stimulus-driven actions that may influence driving behaviors of the driver when conducting the one or more driving maneuvers. Accordingly, respective annotations and related data may be added to the naturalistic driving behavior data set 300 that are attributed to the attention capturing traffic related objects 308.

Referring again to FIG. 1, the vehicle camera system 110 may include one or more cameras 112 that are positioned at one or more exterior and interior portions of the vehicle 102. The camera(s) 112 may be positioned in a direction to capture the surrounding environment of the vehicle 102. In an exemplary embodiment, the surrounding environment of the vehicle 102 may be defined as a predetermined area located in around (front/sides/behind) the vehicle 102 (e.g., road environment in front, sides, and/or behind of the vehicle 102) that may be included within the vehicle's travel path. The one or more cameras 112 of the vehicle camera system 110 may be disposed at external front and/or side portions of the vehicle 102, including, but not limited to different portions of the vehicle bumper, vehicle front lighting units, vehicle fenders, and the windshield. In one configuration, the one or more cameras may include an artificial vision sensor to view a roadway ahead of the vehicle 102. The one or more cameras may be positioned on a planar sweep pedestal (not shown) that allows the one or more cameras to be oscillated to capture images of the external environment of the vehicle 102 at various angles.

In one configuration, the one or more cameras may be configured as a sensor(s) that may include image logic that may provide image data on free space (e.g., road space), lane markings, additional vehicles, pedestrians, traffic signs, traffic signals, and the like that are included within the surrounding environment of the vehicle 102. Such image data may also be utilized to provide advanced driver assistance systems (ADAS) (not shown) in the vehicle 102 to alert the driver of a potentially dangerous situation or provide autonomous vehicle control to adjust operation of the vehicle 102.

In one embodiment, the one or more cameras may be configured to provide image data that includes real-time sensor information pertaining to driving path geometry (e.g., that provides a distance between the center point of the vehicle 102 and lane markings on each side of the vehicle 102). The image data may also include real-time static scene semantics (e.g., traffic signs, road markings) that may be used by the application 106 for providing context to dynamic data provided by the vehicle dynamic sensors 114.

The one or more cameras 112 may provide images/video of the surrounding environment of the vehicle 102. As discussed below, the naturalistic driving application 106 may execute image logic to determine the image data. The application 106 may additionally execute the image logic to determine one or more sets of image coordinates associated with one or more objects that may include, but may not be limited to, traffic participants (e.g., pedestrians, bikers, other vehicles), roadway attributes (e.g., lane markings, off-ramps, curbs), and road side objects (e.g., traffic light, stop sign).

In one or more embodiment, the vehicle dynamic sensors 114 may be included as part of a Controller Area network bus (CAN bus) of the vehicle 102 and may be configured to provide vehicle dynamic data to the ECU 104, one or more vehicle systems (not shown), and to the naturalistic driving application 106. The vehicle dynamic sensors 114 may include, but may not be limited to, velocity sensors, steering speed sensors, steering angle sensors, throttle angle sensors, accelerometers, magnetometers, gyroscopes, brake force sensors, wheel speed sensors, wheel turning angle sensors, yaw rate sensors, transmission gear sensors, temperature sensors, RPM sensors, GPS/DGPS sensors, signal enablement sensors, lighting enablement sensors, and the like (individual sensors not shown).

The vehicle dynamic sensors 114 may provide one or more values (e.g., numeric levels) that are associated with the real-time dynamic performance of the vehicle 102 as the driver conducts one or more driving maneuvers and/or as the vehicle 102 is controlled to be autonomously driven. In particular, the vehicle dynamic sensors 114 may sense and output driver operational inputs that may include, but may not be limited to, steering angle, steering speed, acceleration pedal angle, brake pedal angle, brake pressure, transmission gear shifts, turn signal enablement, and the like. Additionally, the vehicle dynamic sensors 114 may provide vehicular motion operational inputs that may include, but may not be limited to, velocity and yaw rate associated with the movement of the vehicle 102.

As discussed below, sensor data provided by the vehicle dynamic sensors 114 may be utilized to provide behavioral event detection that is used to classify and annotate one or more driving behaviors. As described below, the naturalistic driving application 106 may utilize the vehicle dynamic data in conjunction with the image data to provide the four layer annotation scheme to build and add the annotations and related data to the naturalistic driving behavior data set 120 of the neural network 116.

II. The Naturalisitic Driving Application and Related Methods

The components of the naturalistic driving application 106 will now be described according to an exemplary embodiment and with reference to FIG. 1. In an exemplary embodiment, the naturalistic driving application 106 may be stored on the memory 108 and executed by the ECU 104 of the vehicle 102. In another embodiment, the naturalistic driving application 106 may be stored on the externally hosted computing infrastructure and may be accessed by the communication device of the ECU 104 to be executed by the ECU 104 of the vehicle 102.

The general functionality of the naturalistic driving application 106 will now be discussed. In an exemplary embodiment, the naturalistic driving application 106 may include a data reception module 122, a data determinant module 124, a driver action determinant module 126, and a vehicle control module 128. Methods and examples describing process steps that are executed by the modules 122-128 of the naturalistic driving application 106 will now be described in more detail.

Figure 4:
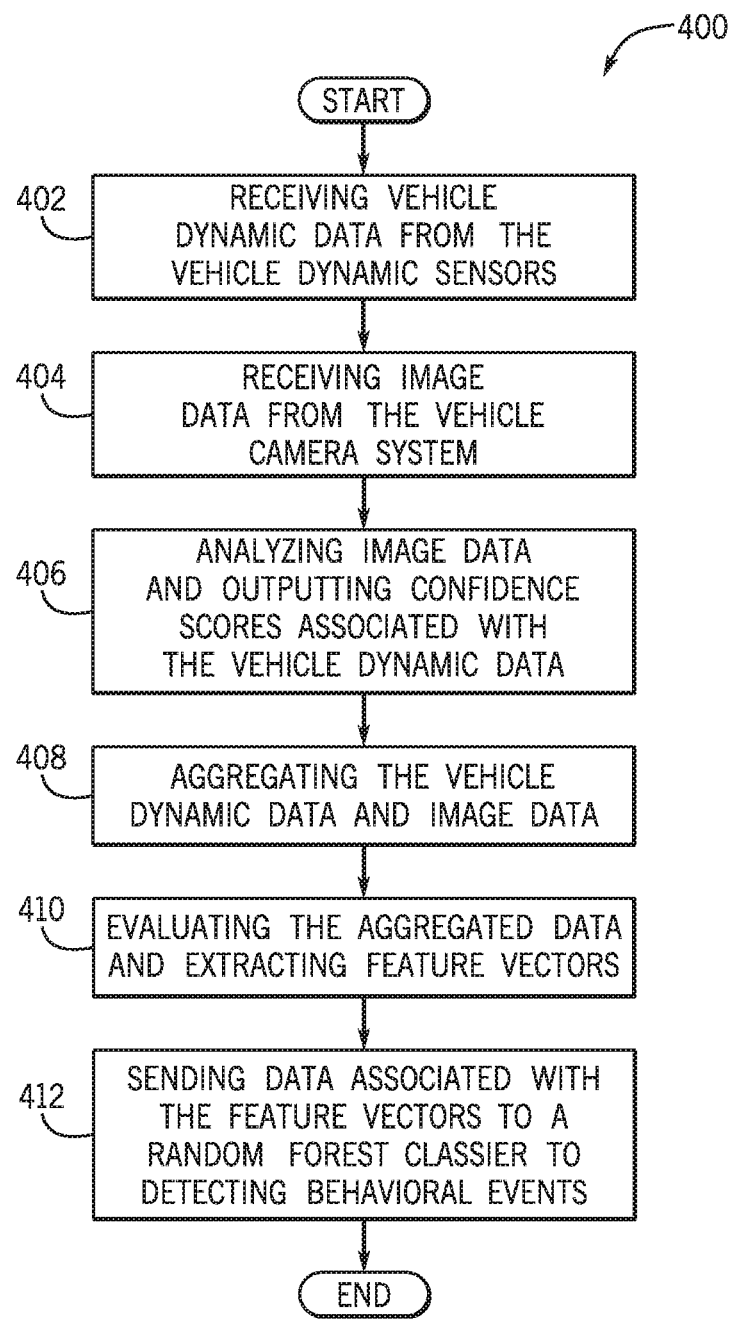
FIG. 4 is a process flow diagram of a method for detecting one or more behavioral events based on vehicle dynamic data and image data according to an exemplary embodiment of the present disclosure.

FIG. 4 is a process flow diagram of a method 400 for detecting one or more behavioral events based on vehicle dynamic data and image data according to an exemplary embodiment of the present disclosure. FIG. 4 will be described with reference to the components of FIG. 1, though it is to be appreciated that the method 400 of FIG. 4 may be used with other systems/components. The method 400 may begin at block 402, wherein the method 400 may include receiving vehicle dynamic data from the vehicle dynamic sensors 114.

In an exemplary embodiment, the data reception module 122 of the naturalistic driving application 106 may communicate with the vehicle dynamic sensors 114 of the vehicle 102 to collect the vehicle dynamic data (e.g., sensor inputs). In particular, the vehicle dynamic data may include driver operational inputs that may include, but may not be limited to, steering angle data, steering speed data, acceleration pedal angle data, brake pedal angle data, brake pressure data, transmission gear shift data, turn signal enablement data, brake force data, throttle angle data, vehicle acceleration data, wheel speed data, temperature data, RPM data, GPS/DGPS data, and the like. Additionally, the vehicle dynamic data may include vehicular motion operational inputs that may include, but may not be limited to, velocity data and yaw rate data.

In one embodiment, the data reception module 122 may collect the vehicle dynamic data for each trip of the vehicle 102. The data reception module 122 may package and store the vehicle dynamic data on the memory 108 as a data package (vehicle trip dynamic data) (not shown) that is associated with the respective trip of the vehicle 102. In particular, the vehicle trip dynamic data may be associated with a timeframe of data collection (e.g., a start point/time, end point/time, and duration/timeframe of the respective trip of the vehicle 102) to be utilized to further classify and annotate the behavioral events during the trip of the vehicle 102. In one embodiment, upon receiving the vehicle dynamic data, the data reception module 122 may communicate the vehicle dynamic data to the data determinant module 124.

The method 400 may proceed to block 404, wherein the method 400 may include receiving image data from the vehicle camera system 110. In an exemplary embodiment, the data reception module 122 may communicate with the vehicle camera system 110 to collect image data that includes data pertaining to images/video of the surrounding environment of the vehicle 102. The image data may additionally include distance(s) between a center point (not shown) of the vehicle 102 and one or more lane markers of a lane of a roadway on which the vehicle 102 is traveling during the trip of the vehicle 102. In one embodiment, the data reception module 122 may package and store the image data on the memory 108 that is associated with the vehicle trip dynamic data (stored at block 402). The image data may be utilized to further classify one or more behavioral events detected during each trip of the vehicle 102.

The method 400 may proceed to block 406, wherein the method 400 may include analyzing image data and outputting confidence scores associated with a lane detection. In an exemplary embodiment, the data reception module 122 may communicate the image data to the data determinant module 124 to be analyzed with respect to distance measurements with respect the center of the vehicle 102 and a right lane and/or a left lane and may output corresponding confidence scores associated with a lane detection provided by the vehicle camera system 110. Upon determining the confidence scores associated with the lane detection based on the image data, the data determinant module 124 may access the memory 108 and store the confidence scores. The confidence scores may provide an indication as to a weight that is associated with the image data with respect to the detection of one or more behavioral events by the application 104.

The method 400 may proceed to block 408, wherein the method 400 may include aggregating the vehicle dynamic data and image data. In an exemplary embodiment, the data determinant module 124 may communicate with the neural network processing unit 118 to utilize one or more machine learning/deep learning fusion processes to aggregate the vehicle dynamic data and the image data stored on the memory 108 by the data reception module 122. The aggregation may be weighted such that the confidence scores associated with the lane detection may influence an amount of weight associated with the image data with respect to the aggregation with the vehicle dynamic data. For example, if a higher confidence score is output upon the analysis of lane detections within the image data, the image data may hold a greater weight (e.g., may be utilized more during aggregation processing) during aggregation of image data and vehicle dynamic data to output aggregated data that may be greatly impacted by the image data that may pertain to the position changes of the vehicle 102 on a roadway.

The method 400 may proceed to block 410, wherein the method 400 may include evaluating the aggregated data and extracting feature vectors. In an exemplary embodiment, the data determinant module 124 may utilize the neural network processing unit 118 to evaluate the aggregated data and classify a plurality of frames associated with the vehicle dynamic data based on the aggregated vehicle dynamic data and image data. In particular, the neural network processing unit 118 may execute machine learning/deep learning and may down sample the aggregated sensor inputs (e.g., aggregated vehicle dynamic data and image data) by lowering its sampling rate or sample size (e.g. down sampled to 5 Hz bits per sample). The down sampling may allow the bit rate to be decreased to more efficiently process the aggregated data.

In one or more embodiments, the data determinant module 124 may send one or more commands to the neural network processing unit 118 to convert the down sampled data into a plurality of frames (e.g., data frames). Each of the plurality of frames may include aggregated data that pertains to a particular type of sensor input provided by a particular sensor of the vehicle dynamic sensors 114. For example, the plurality of frames may include aggregated data that pertains to a steering angle data provided by steering angle sensors that are analyzed with respect to aggregated data.

In an exemplary embodiment, the neural network processing unit 118 may execute machine learning/deep learning to extract feature vectors from an N second context window. The neural network processing unit 118 may extract the feature vectors associated with each particular sensor input of the sensor inputs provided by each particular sensor of the vehicle dynamic sensors 114. The feature vectors may be extracted from each frame of the plurality of frames associated with the aggregated data. The plurality of frames may include a frame that is classified as a target frame that includes mean sensor inputs in the middle of a plurality of frames. For example, the neural network processing unit 118 may extract feature vectors associated with each particular sensor input of the driver operational inputs and the vehicular motion operational inputs as received by the data reception module 122 (at block 402) for five frames that include a third frame that is classified as the target frame.

In one embodiment, the data determinant module 124 may utilize the neural network processing unit 118 to extract a plurality of feature vectors associated with each sensor input. More specifically, for each sensor input, the neural network processing unit 118 may output a plurality of feature vectors associated with the frames that may include, but may not be limited to, a value of the target frame, a maximum value of the respective sensor input, a minimum value of the respective sensor input, an average value of the respective sensor input, a slope of the values within the N second context time window. In some embodiments, the neural network processing unit 118 may utilize different sliding window sizes to output different feature vectors. For example, different feature vectors may be obtained through a sliding window with a 200-msec frame shift.

The method 400 may proceed to block 412, wherein the method 400 may include sending data associated with the feature vectors to a random forest classifier to detect behavioral events. In one embodiment, the neural network processing unit 118 may send feature vectors associated with each sensor input of a plurality of frames to a random forest classifier. The random forest classifier may be utilized to classify and detect one or more predefined behavioral events from the one or more frames of aggregated data. The neural network processing unit 118 may apply the random forest classifier as a data classifier to determine if each context window has one or more objects at varying scales pertaining to each data frame to thereby detect and classify one or more predefined behavioral events and one or more background events.

In one embodiment, the neural network processing unit 118 may utilize the random forest classifier to classify one or more feature vectors from the target frame of the plurality of frames (e.g., third frame of five frames per second) of the each sensor input, image data, and associated confidence score (included within the aggregated data) into a predefined behavioral event that is determined from a list of predetermined driving behaviors stored on the naturalistic driving behavior data set 120.

Additionally, one or more feature vectors from one or more frames of the plurality of frames may be classified as background events that are not directly impacting the driving maneuver conducted by the driver of the vehicle 102. In particular, the list of predetermined driving behaviors may be associated with a range of feature vectors for each sensor input that may be analyzed to classify the behavioral event based on the utilization of the random forest classifier. Accordingly, at least one background element that may not be associated with the range of feature vectors for each sensor input maybe classified based on one or more corresponding feature vectors.

In an exemplary embodiment, upon detecting one or more behavioral events based on the utilization of the random forest classifier, the neural network processing unit 118 may communicate respective data to the data determinant module 124. The data determinant module 124 may be configured to communicate respective data to the driver action determinant module 126 of the naturalistic driving application 106.

In some configurations, the data determinant module 124 of the naturalistic driving application 106 may employ the neural network 116 to evaluate behavioral event detection performance to analyze an optimum context time window (e.g., optimum window size based on number of seconds) used for detecting one or more behavioral events. The neural network processing unit 118 may be configured to evaluate the event detection performance based on a detection interval defined for each detected behavioral event. The neural network processing unit 118 may set a threshold for the detection interval of each behavioral event and may determine if the interval was detected when more than a threshold percentage of the frames of the interval were correctly classified to the event class.

Figure 5:
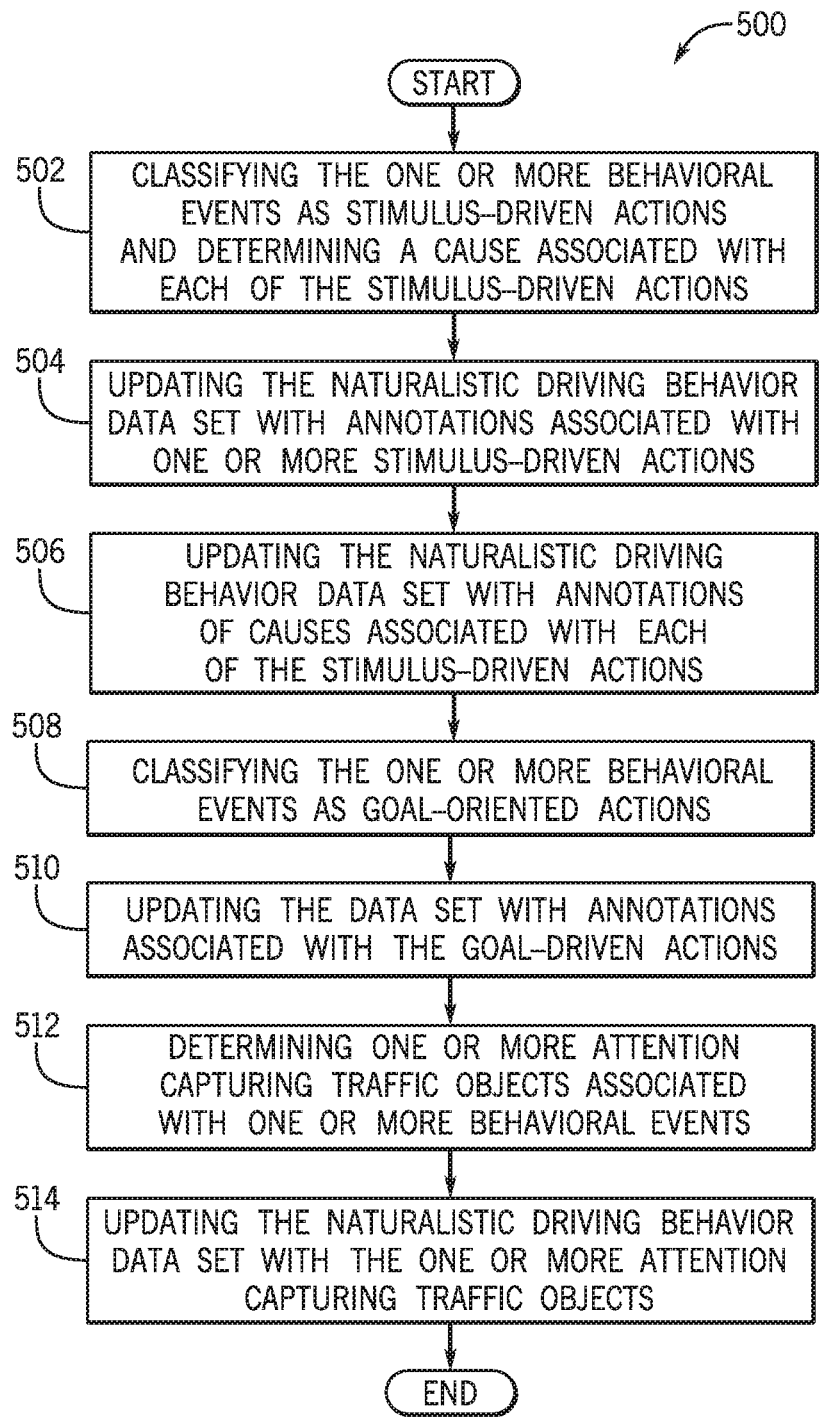
FIG. 5 is a process flow diagram of a method for providing a four layer annotation scheme according to an exemplary embodiment of the present disclosure.

FIG. 5 is a process flow diagram of a method 500 for providing the four layer annotation scheme according to an exemplary embodiment of the present disclosure. FIG. 5 will be described with reference to the components of FIG. 1, though it is to be appreciated that the method of FIG. 5 may be used with other systems/components. The method 500 may begin at block 502, wherein the method 500 may include classifying the one or more behavioral events as stimulus-driven actions and determining the cause associated with each of the stimulus-driven actions. The driver action determinant module 126 may investigate the stimulus-driven action(s) classified by the application 104 as a primary step towards understanding a relationship and reasoning of driving behavior in providing the four layer annotation scheme. Accordingly, the naturalistic driving behavior data set may be built to include annotations that are based on at least one behavioral event that is classified as the stimulus-driven action.

In an exemplary embodiment, the driver action determinant module 126 may communicate with the neural network processing unit 118 to evaluate one or more characteristics associated with one or more behavioral events to determine stimulus-driven behavioral events. In particular, the driver action determinant module 126 may evaluate the one or more driving behavioral events and associated image data that pertains to one or more traffic related objects that may be located within a travel path of the vehicle 102, to determine a driving scene of the vehicle 102 that is associated with each of the one or more detected behavioral events. The driving scene of the vehicle 102 may include attributes associated with the surrounding environment of the vehicle 102 as a respective driving maneuver associated with one or more respective behavioral events is conducted.

Additionally, the driving scene may include the classifications, characteristics, locations, ranges, and positions of one or more traffic related objects that are located within the surrounding environment of the vehicle 102 (with respect to the vehicle 102) as one or more respective behavioral events occur. The driver action determinant module 126 may thereafter evaluate the driving scene to determine the context of one or more behavioral events if the one or more behavioral events occur due to external stimuli that is present within the surrounding environment of the vehicle 102.

In particular, the driver action determinant module 126 may evaluate each detected behavioral event and traffic related object characteristics (e.g., traffic light state, position, location, and range of objects, speed of the vehicle, steering angle, braking force, etc.) to determine external stimuli that is a (partial or full) cause of the one or more behavioral events. Based on the determination of the external stimuli that is a cause of the behavioral event(s) from the evaluation of the driving scene, the driver action determinant module 126 may classify one or more of the behavioral events as stimulus-driven actions.

As an illustrative example, the evaluation of the behavioral events and associated image data may allow the determination that the vehicle 102 is stopped due to a presence of a traffic related object that may be further specified as a leading vehicle that has stopped in front of the vehicle 102. The driver action determinant module 126 may evaluate the driving scene to determine the context of the behavioral event of the stopping of the vehicle 102 that is based on one or more possible external stimuli. The one or more possible external stimuli may be determined as one or more causes associated with the behavioral event of stopping that is further classified as a stimulus-driven action based on the determination of the one or more possible external stimuli as the cause for stopping the vehicle 102.

The method 500 may proceed to block 504, wherein the method 500 may include updating the naturalistic driving behavior data set 120 with annotations associated with the one or more stimulus-driven actions. In an exemplary embodiment, upon classifying the one or more behavioral events as the stimulus-driven actions, the driver action determinant module 126 may communicate with the neural network processing unit 118 to access the naturalistic driving behavior data set 120 stored on the memory 108 of the vehicle 102.

In one configuration, the driver action determinant module 126 may add one or more annotations that describe the one or more driving behavioral events classified as stimulus-driven actions to the naturalistic driving behavior data set 120. The driver action determinant module 126 may additionally add related data associated with the one or more behavioral events classified as the stimulus-driven actions. The related data may include, but may not be limited to, vehicle dynamic data, traffic related data, object location data, and/or additional image data associated with the stimulus-driven action(s).

In an additional embodiment, the one or more annotations may be manually added to the naturalistic driving behavior data set 120 by a plurality of independent human annotators using open source software (e.g., ELAN[2]) after manual evaluation of image data and the one or more detected behavioral events as communicated by the data determinant module 124. The one or more human annotations may be communicated to the neural network 116 through communication between the communication device of the ECU 104 and the externally hosted computing infrastructure. Upon the ECU 104 receiving the one or more annotations, the one or more annotations may be communicated to the neural network 116 to update the naturalistic driving behavior data set 120.

As an illustrative example, the manual annotation scheme may involve the annotation of one or more driving sessions by two independent human annotators using the open source software. A third annotator may merge the annotations provided by the two independent human annotators with his/her own annotations based on his/her own judgment into a single annotation. An expert annotator (e.g., fourth annotator) may thereafter review and obtain a final version of an expert annotation. The final version of the expert annotation may be compared against the signal annotation provided by the third annotator on up to ten different sessions to determine if a threshold percentage of agreement is found between the expert annotations and the annotations provided by the third annotator. Therefore, the manual addition of the one or more annotations may be systematically evaluated to ensure annotation quality before they are communicated to the neural network 116 to update the naturalistic driving behavior data set 120.

Figure 6:
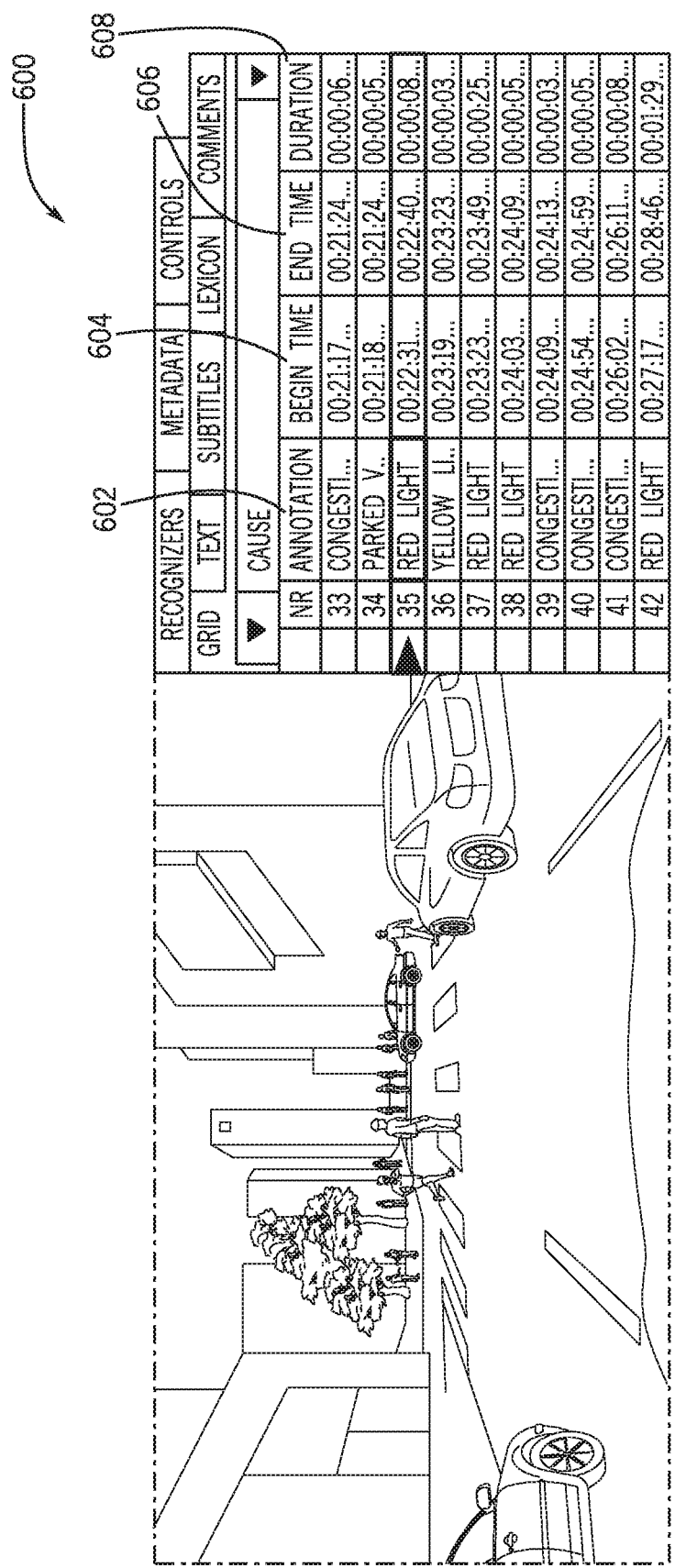
FIG. 6 is an illustrated example of manually adding annotations associated with causes according to an exemplary embodiment of the present disclosure.

As shown in FIG. 6, an illustrated example of manually adding annotations associated with causes, annotations 602 that describe detected behavioral events may be manually added to the naturalistic driving behavior data set 120. The annotations 602 may be provided for one or more time frames of the vehicle trip and may include one or more behavioral events that are detected based on the utilization of the random forest classifier. The annotations 602 may be added manually to include a short description of causes (e.g., external stimuli) that additionally include related data such as a begin time 604, an end time 606, and a duration 608 of each of the annotated causes.

With reference to FIG. 1, in one or more embodiments, the driver action determinant module 126 may evaluate the naturalistic driving behavior data set 120 to determine if one or more annotations that describe the one or more behavioral events classified as stimulus-driven actions have been previously added to the data set 120. If it is determined that one or more driving maneuvers classified as stimulus-driven actions have been previously added to the data set 120, the driver action determinant module 126 may annotate a number of instances of each respective driving maneuver classified as a stimulus-driven actions that have been classified over a predetermined period of time (e.g., 180 days). Additionally, the driver action determinant module 126 may annotate an average duration of each respective behavioral event classified as a stimulus-driven action.

As shown in the illustrative example of FIG. 3, the naturalistic driving behavior data set 300 may include annotations associated with respective driving maneuvers classified as the stimulus-driven action 304. Additionally, the naturalistic driving behavior data set 300 may include annotations associated with the number of instances of the stimulus-driven actions 304 and the average duration of the stimulus-driven actions 304. It is to be appreciated that the naturalistic driving behavior data set may be annotated with related data that is associated with the context of one or more driving maneuvers classified as the stimulus-driven actions 304.

The method 500 may proceed to block 506, wherein the method 500 may include updating the naturalistic driving behavior data set 120 with annotations of causes associated with each of the stimulus-driven actions. The driver action determinant module 126 may evaluate the driving scene to determine the external stimuli that is present within the surrounding environment of the vehicle 102 as the cause of the one or more behavioral events classified as stimulus-driven action(s). In an exemplary embodiment, upon determining the causal relationship between the external stimuli and the stimulus-driven action(s), the driver action determinant module 126 may communicate with the neural network processing unit 118 to access the naturalistic driving behavior data set 120 stored on the memory 108 of the vehicle 102.

In one embodiment, the driver action determinant module 126 may add one or more annotations that describe one or more causes associated with the stimulus-driven actions to the naturalistic driving behavior data set 120. The one or more annotations may be added with related data that includes an identifier that identifies and links the casual relationship between each cause and each stimulus-driven action. Additional related data that may be added to the naturalistic driving behavior data set 120, may include, but may not be limited to data associated with the cause (e.g., type of traffic related object), vehicle location, location, position, and range of traffic related object(s), and/or additional image data associated with the stimulus-driven action(s).

In an additional embodiment, the one or more annotations may be manually added to the naturalistic driving behavior data set 120 by a plurality of independent human annotators using open source software after manual evaluation of image data (e.g., videos) and vehicle dynamic data. The one or more human annotations may be communicated to the neural network 116 through communication between the communication device of the ECU 104 and the externally hosted computing infrastructure. Upon the ECU 104 receiving the one or more annotations, the one or more annotations may be communicated to the neural network 116 to update the naturalistic driving behavior data set 120.

With continued reference to FIG. 1, in one or more embodiments, the driver action determinant module 126 may evaluate the naturalistic driving behavior data set 120 to determine if one or more annotations associated with cause(s) of the stimulus-driven action(s) have been previously added to the data set 120. If it is determined that the one or more annotations have been previously added to the data set 120, the driver action determinant module 126 may annotate a number of instances of each respective cause that have been determined over a predetermined period of time (e.g., 180 days). Additionally, the driver action determinant module 126 may annotate an average duration of each respective external stimuli determined to be a cause of each stimulus-driven action.

As shown in the illustrative example of FIG. 3, the naturalistic driving behavior data set 300 may include annotations associated with the cause 306 associated with each of the stimulus-driven actions 304. Additionally, the naturalistic driving behavior data set 300 may include annotations associated with the number of instances of the cause 306 and the average duration of the cause 306. It is to be appreciated that the naturalistic driving behavior data set 120 may additionally be annotated with related data (e.g., location, position, range, characteristics of the cause) and indications that link each cause 306 to a stimulus-driven action 304.

The method 500 may proceed to block 508, wherein the method 500 may include classifying one or more behavioral events as goal-oriented actions. In an exemplary embodiment, the driver action determinant module 126 may evaluate one or more of the one or more behavioral events classified as stimulus-driven actions to further evaluate the driving scene of the vehicle 102 to classify one or more behavioral events as goal-oriented actions.

The driver action determinant module 126 may evaluate the driving scene and the stimulus-driven actions using ground truth labels to determine a context of one or more behavioral events classified as stimulus-driven events to determine if one or more additional behavioral events (in addition to the one or more behavioral events classified as stimulus-driven events) are conducted absent of an external stimuli that is present within the surrounding environment of the vehicle 102.

In particular, the driver action determinant module 126 may evaluate one or more behavioral events, the context of the driving maneuver, and traffic related object characteristics (e.g., traffic light state, position of objects), to determine that the driver may have intended to make one or more driving maneuvers that are associated with one or more behavioral events independent of any external stimuli (e.g., associated with one or more traffic related objects). Based on this evaluation, the driver action determinant module 126 may classify the one or more behavioral events that are independent of any external stimuli as a goal-oriented action(s).

The method 500 may proceed to block 510, wherein the method 500 may include updating the naturalistic driving behavior data set with annotations associated with one or more goal-oriented actions. In an exemplary embodiment, upon classifying the one or more behavioral events as goal-oriented actions, the driver action determinant module 126 may communicate with the neural network processing unit 118 to access the naturalistic driving behavior data set 120 stored on the memory 108 of the vehicle 102.

In one embodiment, the driver action determinant module 126 may add one or more annotations associated with the one or more behavioral events classified as goal-oriented actions to the naturalistic driving behavior data set 120. The driver action determinant module 126 may additionally add related data associated with the one or more driving maneuvers classified as the goal-oriented actions. The related data may include, but may not be limited to, vehicle dynamic data, traffic related object location data, and/or additional image data associated with the goal-oriented action(s).

In an additional embodiment, the one or more annotations may be manually added to the naturalistic driving behavior data set 120 by a plurality of independent human annotators using open source software (e.g., ELAN[2]) after manual evaluation of image data and the one or more behavioral events communicated by the data determinant module 124. The one or more human annotations may be communicated to the neural network 116 through communication between the communication device of the ECU 104 and the externally hosted computing infrastructure. Upon the ECU 104 receiving the one or more annotations, the one or more annotations may be communicated to the neural network 116 to update the naturalistic driving behavior data set 120.

In one or more embodiments, the driver action determinant module 126 may evaluate the naturalistic driving behavior data set 120 to determine if one or more annotations that describe the one or more behavioral events classified as goal-oriented actions have been previously added to the data set 120. If it is determined that one or more driving behavioral events classified as goal-oriented actions have been previously added to the data set 120, the driver action determinant module 126 may annotate a number of instances of each respective behavioral event classified as a goal-oriented action that have been classified over a predetermined period of time (e.g., 180 days). Additionally, the driver action determinant module 126 may annotate an average duration of each respective behavioral event classified as a goal-oriented action.

As shown in the illustrative example of FIG. 3, the naturalistic driving behavior data set 300 may include annotations associated with respective driving maneuvers classified as the goal-oriented action 302. Additionally, the naturalistic driving behavior data set 300 may include annotations associated with the number of instances of the goal-oriented actions and the average duration of the goal-oriented actions 302 that have been classified over a predetermined period of time. It is to be appreciated that the naturalistic driving behavior data set 120 may be annotated with related data that is associated with the context of one or more driving maneuvers classified as the goal-oriented actions.

The method 500 may proceed to block 512, wherein the method 500 may include determining one or more attention capturing traffic objects associated with one or more behavioral events. In one embodiment, the driver action determinant module 126 may evaluate each detected behavioral event that is classified as the stimulus-driven event and may further analyze traffic related object characteristics (e.g., traffic light state, position, location, and range of objects, speed of the vehicle, yaw rate, steering angle, braking force, etc.) to determine one or more traffic related objects that may be located within a travel path of the vehicle 102 (e.g., part of the roadway, on the roadway, on the side of the roadway) that may indicate one or more sensor inputs associated with one or more behavioral events (e.g., steering angle data that indicates the behavioral event of swerving). The neural network processing unit 118 may thereafter classify the one or more traffic related objects as attention capturing traffic objects associated with one or more behavioral events classified as stimulus-driven events.

The method 500 may proceed to block 514, wherein the method 500 may include updating the naturalistic driving behavior data set 120 with the one or more attention capturing traffic related objects. In an exemplary embodiment, upon determining the one or more attention capturing traffic related objects associated with one or more behavioral events, the driver action determinant module 126 may communicate with the neural network processing unit 118 to access the naturalistic driving behavior data set 120 stored on the memory 108 of the vehicle 102. In one embodiment, the driver action determinant module 126 may add related data associated with one or more attention capturing traffic related objects to the naturalistic driving behavior data set 120 that may include, but may not be limited to, characteristics of each of the attention capturing traffic related objects, position, range, and location of each of the attention capturing traffic related objects, vehicle dynamic data, image data, and the like.

In an additional embodiment, the one or more annotations may be manually added to the naturalistic driving behavior data set 120 by a plurality of independent human annotators using open source software (e.g., ELAN[2]) after manual evaluation of image data and the one or more behavioral events communicated by the data determinant module 124. The one or more human annotations may be communicated to the neural network 116 through communication between the communication device of the ECU 104 and the externally hosted computing infrastructure. Upon the ECU 104 receiving the one or more annotations, the one or more annotations may be communicated to the neural network 116 to update the naturalistic driving behavior data set 120.

In one or more embodiments, the driver action determinant module 126 may evaluate the naturalistic driving behavior data set 120 to determine if one or more annotations that describe the one or more attention capturing traffic related objects have been previously added to the data set 120. If it is determined that one or more attention capturing traffic related objects have been previously added to the data set 120, the driver action determinant module 126 may annotate a number of instances of each respective action capturing traffic related object that has been determined over a predetermined period of time (e.g., 180 days). Additionally, the driver attention determinant module 134 may annotate an average duration of time each respective attention capturing traffic related objects may capture the attention of the driver.

As shown in the illustrative example of FIG. 3, the naturalistic driving behavior data set 300 may include annotations associated with each respective attention capturing traffic related objects as an attention capturing traffic related object(s) (shown as attention). The driver action determinant module 126 may annotate an average duration of time with respect to each respective attention capturing traffic related object 308 that may capture the attention of the driver. The naturalistic driving behavior data set 120 may be annotated with additional information that includes the respective positions/locations of each respective attention capturing traffic related objects with respect to the vehicle 102.

Figure 7:
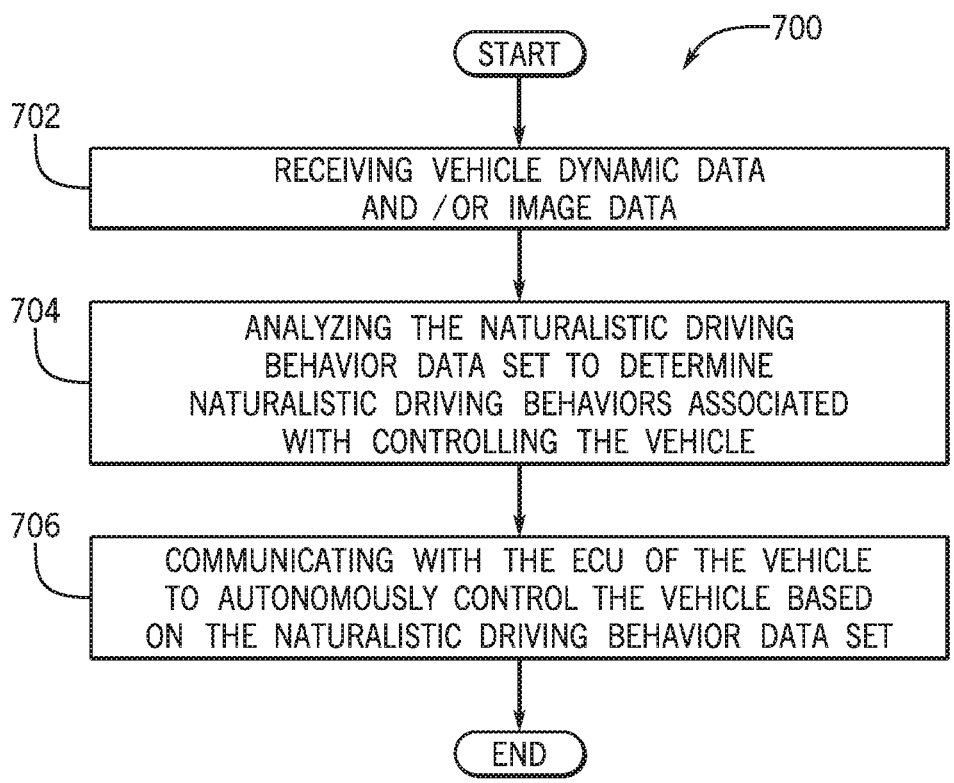
FIG. 7 is a process flow diagram of a method for controlling the vehicle to be autonomously driven based on the naturalistic driving behavior data set according to an exemplary embodiment of the present disclosure.

FIG. 7 is a process flow diagram of a method 700 for controlling the vehicle 102 to be autonomously driven based on the naturalistic driving behavior data set 120 according to an exemplary embodiment of the present disclosure. FIG. 7 will be described with reference to the components of FIG. 1, though it is to be appreciated that the method of FIG. 7 may be used with other systems/components. The method 700 may begin at block 702, wherein the method 700 may include receiving vehicle dynamic data and/or image data.

In an exemplary embodiment, if the vehicle 102 is set to be partially or fully autonomously driven (e.g., by the driver of the vehicle 102 actuating one or more safety features, an occupant actuating full autonomous driving control of the vehicle 102, and/or by the ECU 104), the ECU 104 may communicate with the vehicle dynamic sensors 114 and/or the vehicle camera system 110 to receive the vehicle dynamic data and/or image data. Upon receiving the vehicle dynamic data and/or image data, the ECU 104 may communicate the respective data to the vehicle control module 128 of the naturalistic driving application 106.

In one embodiment, the vehicle control module 136 may process the vehicle dynamic data to determine vehicle speed data, steering speed data, steering angle data, throttle angle data, vehicle acceleration data, brake force data, wheel speed data, wheel turning angle data, yaw rate data, transmission gear data, temperature data, RPM data, GPS/DGPS data, and the like that is applicable to the current operation of the vehicle 102.

In some configurations, the vehicle control module 136 may additionally process the image data to determine the location, range, and position of the one or more traffic related objects with respect to the current location of the vehicle 102 and the travel path of the vehicle 102. The vehicle control module 136 may analyze the vehicle dynamic data and image data, to determine one or more driving scene scenarios and the one or more traffic related objects that may affect the operation of the vehicle 102 when traveling within the surrounding environment of the vehicle 102.

The method 700 may proceed to block 704, wherein the method 700 may include analyzing the naturalistic driving behavior data set to determine naturalistic driving behavior associated with controlling the vehicle 102. In an exemplary embodiment, upon determining the one or more driving scene scenarios and the one or more traffic related objects that may affect the operation of the vehicle 102 when traveling within the surrounding environment of the vehicle 102, the vehicle control module 136 may communicate with the neural network 116 to determine naturalistic driving behavior associated with controlling the vehicle 102 with respect to the one or more driving scene scenarios and the one or more traffic related objects.

In particular, the vehicle control module 136 may communicate with the neural network 116 to analyze the one or more driving scene scenarios and the one or more traffic related objects to predict one or more possible driving maneuvers that may be utilized to safely navigate the vehicle 102. Upon predicting the one or more possible driving maneuvers, the vehicle control module 136 may communicate with the neural network processing unit 118 to access the naturalistic driving behavior data set 120 and to utilize machine learning/deep learning to predict one or more events associated with one or more possible driving maneuvers based on the one or more driving scene scenarios and the one or more traffic related objects.

In one embodiment, the neural network processing unit may utilize the CNN and sensor data to encode each video/image frame provided by the vehicle camera system 110 by extracting convolutional features (e.g., features extracted from shallow, medium, and deep layers) using an InceptionResnet-C2 network (e.g., hybrid deep learning network) and may pool them using a fixed-length vector. Sensor data may also be fused (as discussed above) to the image data and such data may be fed to a LSTM to predict a behavior label. The neural network processing unit 118 may predict that the operation of the vehicle 102 may require one or more driving maneuvers.

Upon the prediction of the one or more driving maneuvers, the neural network processing unit 118 may query the naturalistic driving behavior data set 120 with data representing each of the behavioral events associated with one or more particular driving maneuvers to retrieve annotations and additional data associated with the goal-oriented action(s) and/or the stimulus-driven action(s). The neural network processing unit 118 may additionally query the naturalistic driving behavior data set 120 based on one or more traffic related objects that are determined (at block 702) to retrieve one or more annotations and related data associated with one or more attention capturing traffic related objects.

Additionally, the neural network processing unit 118 may query the naturalistic driving behavior data set based on one or more traffic related objects that are determined (at block 702) to retrieve annotations and additional data associated with one or more causes related to the one or more behavioral events classified as the stimulus-driven actions. Upon retrieving the one or more annotations and related data from the naturalistic driving behavior data set 120, the neural network processing unit 118 may communicate the one or more annotations and related data associated with the four-layer annotation scheme to the vehicle control module 136.

The method 700 may proceed to block 706, wherein the method 700 may include communicating with the ECU 104 of the vehicle 102 to autonomously control the vehicle 102 based on the naturalistic driving behavior data set. In an exemplary embodiment, upon receiving the annotations and related data associated with the four-layer annotation scheme, the vehicle control module 136 may analyze the data (e.g., annotations, related data, duration associated with each annotation, number of instances associated with each annotation) and may determine one or more driver behavior models that include one or more discrete actions that may be conducted to autonomously control the vehicle 102 utilizing naturalistic driving behavior.

The vehicle control module 136 may thereby communicate with the ECU 104 of the vehicle 102 to autonomously control the vehicle 102 to be driven based on the one or more driver behavior models that include the one or more discrete actions to implement naturalistic driving behaviors in various driving scenes and circumstances. The ECU 104 may communicate with one or more of the control units of the vehicle 102 to thereby control the vehicle 102 to be driven autonomously based on the naturalistic driving behavior data set 120 to control the vehicle 102 to execute naturalistic driving behavior with a high level of driving scene understanding.

As an illustrative example, the vehicle control module 136 may utilize one or more annotations and additional data to determine one or more driver behavior models that may include one or more discrete actions that may be conducted by the vehicle 102 to account for congestion, a crossing vehicle, a merging vehicle, a cross-walk, and a traffic light that may be located within the travel path of the vehicle 102. More specifically, the one or more driver behavior models that include one or more discrete actions associated with stimulus-driven actions that may be conducted in a particular manner(s) (e.g., with the application of a particular speed, acceleration, steering angle, throttle angle, braking force, etc.) to account for one or more causes and one or more attention-capturing traffic related objects to provide naturalistic driving behaviors based on the four layer annotation scheme of the naturalistic driving behavior data set 120.

For instance, the vehicle 102 may be autonomously controlled to slow down (stimulus-driven action) and stop (stimulus-driven action) using a specific braking force (stimulus-driven action) based on traffic congestion (cause), a crossing vehicle (cause), a merging vehicle (cause) and a cross-walk (attention capturing traffic related object) located within the travel path of the vehicle 102 that may be autonomously conducted by the application 106.

Figure 8:
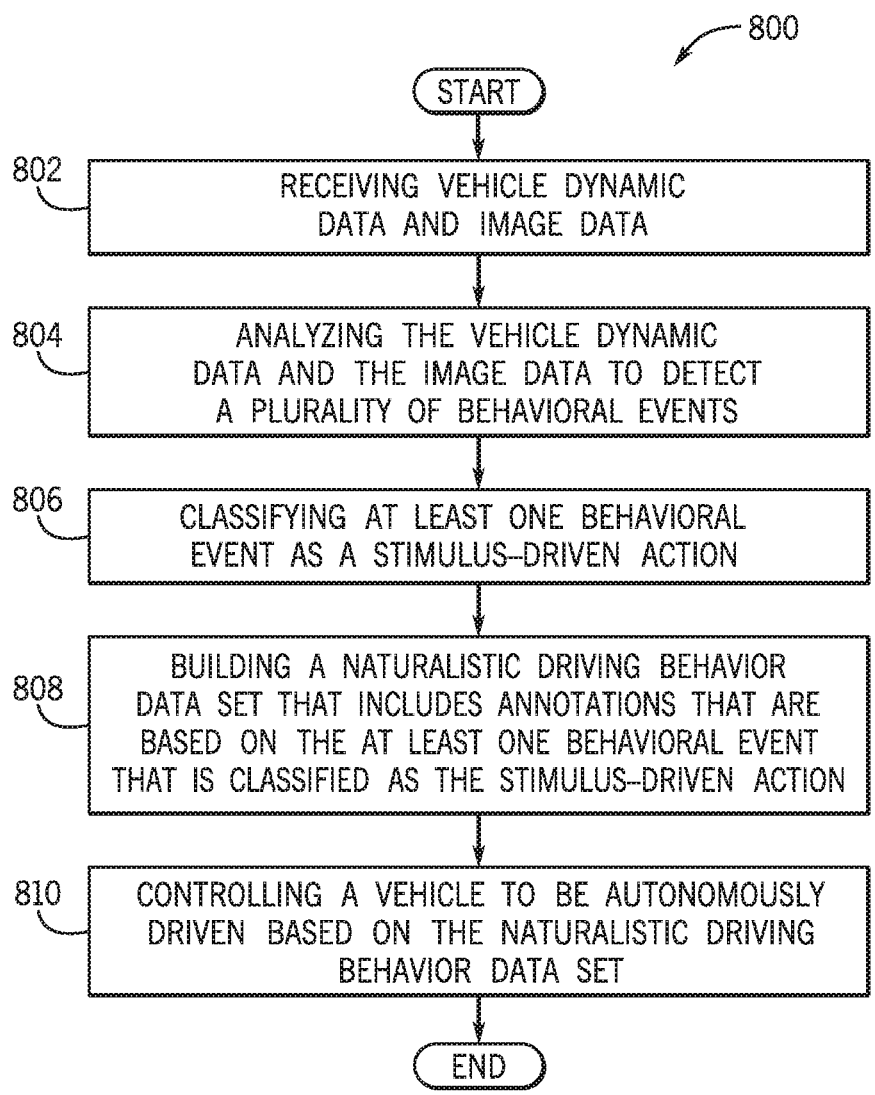
FIG. 8 is a process flow diagram of a method for learning naturalistic driving behavior based on vehicle dynamic data according to an exemplary embodiment of the present disclosure.

FIG. 8 is a process flow diagram of a method 800 for learning naturalistic driving behavior based on vehicle dynamic data according to an exemplary embodiment of the present disclosure. FIG. 8 will be described with reference to the components of FIG. 1, though it is to be appreciated that the method of FIG. 8 may be used with other systems/components. The method 800 may begin at block 802, wherein the method 800 may include receiving vehicle dynamic data and image data. The method 800 may proceed to block 804, wherein the method 800 may include analyzing the vehicle dynamic data and the image data to detect a plurality of behavioral events.

The method 800 may proceed to block 806, wherein the method 800 may include classifying at least one behavioral event as a stimulus-driven action. The method 800 may proceed to block 808, wherein the method includes building a naturalistic driving behavior data set that includes annotations that are based on the at least one behavioral event that is classified as the stimulus-driven action. The method 800 may proceed to block 810, wherein the method 800 may include controlling a vehicle to be autonomously driven based on the naturalistic driving behavior data set.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for learning naturalistic driving behavior based on vehicle dynamic data, comprising:
   receiving vehicle dynamic data and image data;
   analyzing the vehicle dynamic data and the image data to detect a plurality of behavioral events, wherein a plurality of feature vectors that are associated with a down sampled aggregation of the vehicle dynamic data and the image data are extracted and analyzed during a particular timeframe to detect the plurality of behavioral events;
   classifying at least one behavioral event of the plurality of behavioral events as a stimulus-driven action based on determining that an external stimuli is a cause of the at least one behavioral event;
   building a naturalistic driving behavior data set that includes annotations that are based on the at least one behavioral event that is classified as the stimulus-driven action; and
   controlling a vehicle to be autonomously driven based on the naturalistic driving behavior data set.

2. The computer-implemented method of claim 1, wherein receiving the vehicle dynamic data and image data includes receiving driver operational inputs, vehicular motion operational inputs, and at least one distance between a center point of the vehicle and at least one lane marking of a lane of a roadway on which the vehicle is traveling.

3. The computer-implemented method of claim 2, further including analyzing the image data and outputting confidence scores associated with a lane detection, wherein the confidence scores are associated with the determination of at least one distance between the center point of the vehicle and the at least one lane marking of the lane of the roadway on which the vehicle is traveling.

4. The computer-implemented method of claim 3, wherein analyzing the vehicle dynamic data and the image data includes aggregating vehicle dynamic data and image data, wherein the confidence scores associated with the lane detection influence an amount of weight associated with the image data with respect to aggregation with the vehicle dynamic data.

5. The computer-implemented method of claim 3, wherein analyzing the vehicle dynamic data and the image data includes down sampling aggregated data and converting the down sampled aggregated data into a plurality of frames that include the aggregated data that pertains to a particular sensor input provided by a particular sensor of vehicle dynamic sensors that output the vehicle dynamic data.

6. The computer-implemented method of claim 5, wherein analyzing the vehicle dynamic data and the image data includes extracting the plurality of feature vectors from an N second context time window, wherein the plurality of feature vectors are associated with the particular sensor input provided by the particular sensor of the vehicle dynamic sensors.

7. The computer-implemented method of claim 6, wherein a random forest classifier is utilized to classify and detect at least one behavioral event from at least one frame of the plurality of frames of aggregated data.

8. The computer-implemented method of claim 1, wherein classifying the at least one behavioral event as the stimulus-driven action includes evaluating the at least one behavioral event and associated image data that pertains to at least one traffic related object, wherein the external stimuli includes at least one attention capturing traffic related object that is attended to during a course of the at least one behavioral event.

9. The computer-implemented method of claim 1, further including classifying the at least one behavioral event as a goal-driven action based on the stimulus-driven action and determining a cause associated with at least one behavioral event classified as the stimulus-driven action.

10. A system for learning naturalistic driving behavior based on vehicle dynamic data, comprising:
   a memory storing instructions when executed by a processor cause the processor to:
   receive vehicle dynamic data and image data;
   analyze the vehicle dynamic data and the image data to detect a plurality of behavioral events, wherein a plurality of feature vectors that are associated with a down sampled aggregation of the vehicle dynamic data and the image data are extracted and analyzed during a particular timeframe to detect the plurality of behavioral events;
   classify at least one behavioral event of the plurality of behavioral events as a stimulus-driven action based on determining that an external stimuli is a cause of the at least one behavioral event;
   build a naturalistic driving behavior data set that includes annotations that are based on the at least one behavioral event that is classified as the stimulus-driven action; and
   control a vehicle to be autonomously driven based on the naturalistic driving behavior data set.

11. The system of claim 10, wherein receiving the vehicle dynamic data and image data includes receiving driver operational inputs, vehicular motion operational inputs, and at least one distance between a center point of the vehicle and at least one lane marking of a lane of a roadway on which the vehicle is traveling.

12. The system of claim 11, wherein the processor is further caused to analyze the image data and outputting confidence scores associated with a lane detection, wherein the confidence scores are associated with the determination of at least one distance between the center point of the vehicle and the at least one lane marking of the lane of the roadway on which the vehicle is traveling.

13. The system of claim 12, wherein analyzing the vehicle dynamic data and the image data includes aggregating vehicle dynamic data and image data, wherein the confidence scores associated with the lane detection influence an amount of weight associated with the image data with respect to aggregation with the vehicle dynamic data.

14. The system of claim 12, wherein analyzing the vehicle dynamic data and the image data includes down sampling aggregated data and converting the down sampled aggregated data into a plurality of frames that include the aggregated data that pertains to a particular sensor input provided by a particular sensor of vehicle dynamic sensors that output the vehicle dynamic data.

15. The system of claim 14, wherein analyzing the vehicle dynamic data and the image data includes extracting the plurality of feature vectors from an N second context time window, wherein the plurality of feature vectors are associated with the particular sensor input provided by the particular sensor of the vehicle dynamic sensors.

16. The system of claim 15, wherein a random forest classifier is utilized to classify and detect at least one behavioral event from at least one frame of the plurality of frames of aggregated data.

17. The system of claim 10, wherein classifying the at least one behavioral event as the stimulus-driven action includes evaluating the at least one behavioral event and associated image data that pertains to at least one traffic related object, wherein the external stimuli includes at least one attention capturing traffic related object that is attended to during a course of the at least one behavioral event.

18. The system of claim 10, wherein the processor is further caused to classify the at least one behavioral event as a goal-driven action based on the stimulus-driven action and determining a cause associated with at least one behavioral event classified as the stimulus-driven action.

19. A non-transitory computer readable storage medium storing instructions that when executed by a computer, which includes a processor perform a method, the method comprising:
   receiving vehicle dynamic data and image data;
   analyzing the vehicle dynamic data and the image data to detect a plurality of behavioral events, wherein a plurality of feature vectors that are associated with a down sampled aggregation of the vehicle dynamic data and the image data are extracted and analyzed during a particular timeframe to detect the plurality of behavioral events;
   classifying at least one behavioral event of the plurality of behavioral events as a stimulus-driven action based on determining that an external stimuli is a cause of the at least one behavioral event;
   building a naturalistic driving behavior data set that includes annotations that are based on the at least one behavioral event that is classified as the stimulus-driven action; and
   controlling a vehicle to be autonomously driven based on the naturalistic driving behavior data set.

20. The non-transitory computer readable storage medium of claim 19, wherein the method further includes classifying the at least one behavioral event as a goal-driven action based on the stimulus-driven action and determining a cause and the attention capturing traffic related object associated with at least one behavioral event classified as the stimulus-driven action.

* * * * *